United States Patent
Ye et al.

(10) Patent No.: US 10,742,316 B2
(45) Date of Patent: Aug. 11, 2020

(54) APPARATUS AND METHOD FOR MONITORING CHANGE OF POLARIZATION STATE RESULTED FROM OPTICAL LINK AND OPTICAL RECEIVER

(71) Applicant: FUJITSU LIMITED, Kawasaki-shi, Kanagawa (JP)

(72) Inventors: Tong Ye, Beijing (CN); Zhenning Tao, Beijing (CN); Xiaofei Su, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/576,032

(22) Filed: Sep. 19, 2019

(65) Prior Publication Data

US 2020/0106521 A1  Apr. 2, 2020

(30) Foreign Application Priority Data

Sep. 28, 2018 (CN) .......................... 2018 1 1141207

(51) Int. Cl.
*H04B 10/06* (2006.01)
*H04B 10/077* (2013.01)
(Continued)

(52) U.S. Cl.
CPC ..... *H04B 10/0775* (2013.01); *H04B 10/0795* (2013.01); *H04B 10/6162* (2013.01)

(58) Field of Classification Search
CPC ............ H04B 10/6162; H04B 10/6166; H04B 10/6161; H04B 10/616; H04B 10/614; H04B 10/611; H04B 10/60; H04B 10/2507; H04B 10/2569; H04B 10/07951; H04B 10/07953; H04B 10/0795; H04B 10/6971;
(Continued)

(56) References Cited

U.S. PATENT DOCUMENTS 8,571,407 B2  10/2013 Li et al.
9,319,147 B2 *  4/2016 Xie .................... H04B 10/6162
(Continued)

FOREIGN PATENT DOCUMENTS

CN  101686085 A  3/2010
CN  104393917 A  3/2015
(Continued)

OTHER PUBLICATIONS

Yang Xue-guang, etc. "*PMD Monitoring and Compensation in High Speed Optical Communications Systems*"; Journal of Beijing University of Posts and Telecommunications No. 3, vol. 34, Jun. 2011 (5 pages).

*Primary Examiner* — Hanh Phan
(74) *Attorney, Agent, or Firm* — Staas & Halsey LLP (57) ABSTRACT

Embodiment of the present disclosure provide an apparatus and method to monitor a change of a polarization state resulted from an optical link and an optical receiver, in which by obtaining a change matrix of response matrices at two moments, and determining a parameter characterizing a change of a polarization state resulted from an optical link according to feature values of a change matrix in a Stokes space corresponding to the response matrices. The change of the polarization state resulted from the optical link is dynamically monitored in a real-time manner, independent of a polarization state of an input signal of the optical link, and no extra hardware and control may be needed.

10 Claims, 3 Drawing Sheets

(51) Int. Cl.
*H04B 10/61* (2013.01)
*H04B 10/079* (2013.01)

(58) Field of Classification Search
CPC .. H04B 10/6165; H04B 10/6163; H04J 14/06
USPC ....... 398/202, 208, 209, 204, 205, 206, 207,
398/158, 159, 33, 25, 65, 152, 183, 184,
398/188, 147, 81, 136
See application file for complete search history.

(56) References Cited

U.S. PATENT DOCUMENTS

| | | | |
|---|---|---|---|
| 9,515,743 B2* | 12/2016 | Suzuki | H04B 10/6166 |
| 2010/0092168 A1 | 4/2010 | Li et al. | |
| 2012/0002979 A1* | 1/2012 | Xie | H04B 10/6162 |
| | | | 398/208 |

FOREIGN PATENT DOCUMENTS

| | | | |
|---|---|---|---|
| CN | 106921432 A | 7/2017 | |
| CN | 108234061 A | 6/2018 | |

* cited by examiner

APPARATUS AND METHOD FOR MONITORING CHANGE OF POLARIZATION STATE RESULTED FROM OPTICAL LINK AND OPTICAL RECEIVER

CROSS-REFERENCE TO RELATED APPLICATIONS

This application claims the benefit of Chinese Patent Application No. 20181141207.5, filed on Sep. 28, 2018, in the China National Intellectual Property Administration, all of the disclosure of which is incorporated herein by reference.

TECHNICAL FIELD

The present disclosure relates to the field of communication technologies, and in particular to an apparatus and method for monitoring a change of a polarization state and an optical receiver.

BACKGROUND

Coherent optical communications systems play an important role in communication transmission networks due to their huge transmission bandwidths, great potential for expansion, extremely low transmission loss and low cost. In coherent optical communication, in order to ensure stable transmission of signals, an effective method is needed in an optical transceiving system to monitor and deal with various state changes of optical fibers in a natural environment, such as bending, jitter, being hit, and the like. Research suggest that monitoring polarization changes is beneficial to quickly response to, analyze of, and repair of such damages by an optical transceiver. That is, it is desirable to accurately reflect state changes of fibers in an optical link by monitoring changes of polarization states of signals in the optical link.

Currently, there are many different ways to monitor polarization states of a signal. A first method is one based on hardware implementation, in which a DC laser and a commercial polarimeter, or two detectors and an optical rotator, are used to monitor changes of polarization states. The second method is based on receiver digital signal processing, which is capable of tracking changes of polarization states in an optical link at a speed faster than the first method.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

It was found by the inventors that the above first method needs special hardware, which is high in cost and slow in detection speed, and unable to quickly track changes of polarization states in the optical link. And in the second method, an obtained monitoring amount is unable to purely reflect changes of polarization states resulted from a state change of a segment of the optical link (such as a segment of optical fiber), and influence of a polarization state of a signal inputted into the monitoring optical link segment is also included in the monitoring amount, thereby reflecting a total change of polarization state in the optical link. Therefore, changes of the polarization states of an optical link monitoring segment are unable to be truly reflected.

Embodiments of the present disclosure provide an apparatus and method for monitoring a change of a polarization state and an optical receiver, in which by obtaining a change matrix of response matrices at two moments, and determining a parameter characterizing a change of a polarization state resulted from an optical link according to feature values of a matrix of the change matrix in the Stokes space, the change of the polarization state resulted from the optical link only is dynamically monitored in a real-time manner, independent of a polarization state of an input signal of the optical link, and no extra hardware and control may be needed.

According to a first aspect of the embodiments of the present disclosure, there is provided an apparatus for monitoring a change of a polarization state resulted from an optical link, including: an extracting unit configured to extract first equalization coefficients of taps of an equalizer performing equalization processing on a first received signal received at a first moment and second equalization coefficients of taps of the equalizer performing equalization processing on a second received signal received at a second moment; a first calculating unit configured to sum up the first equalization coefficients of the taps of the equalizer to obtain a first response matrix at a zero frequency, and sum up the second equalization coefficients of the taps of the equalizer to obtain a second response matrix at the zero frequency; a second calculating unit configured to determine a change matrix of response matrices at the first moment and the second moment according to the first response matrix and the second response matrix; and a third calculating unit configured to, according to feature values of a matrix of the change matrix in the Stokes space, determine a parameter characterizing a change of a polarization state resulted from an optical link.

According to a second aspect of the embodiments of the present disclosure, there is provided an optical receiver, including the apparatus for monitoring a change of a polarization state resulted from an optical link as described in the first aspect of the embodiments of the present disclosure.

According to a third aspect of the embodiments of the present disclosure, there is provided a method for monitoring a change of a polarization state resulted from an optical link, including: extracting first equalization coefficients of taps of an equalizer performing equalization processing on a first received signal received at a first moment and second equalization coefficients of taps of the equalizer performing equalization processing on a second received signal received at a second moment; summing up the first equalization coefficients of the taps of the equalizer to obtain a first response matrix at a zero frequency, and summing up the second equalization coefficients of the taps of the equalizer to obtain a second response matrix at the zero frequency; determining a change matrix of response matrices at the first moment and the second moment according to the first response matrix and the second response matrix; and according to feature values of matrices of the change matrix in the Stokes space, determining a parameter characterizing a change of a polarization state resulted from an optical link.

An advantage of the embodiments of the present disclosure exists in that by obtaining a change matrix of response matrices at two moments, and determining a parameter characterizing a change of a polarization state resulted from an optical link according to feature values of a matrix of the change matrix in the Stokes space, the change of the polarization state resulted from the optical link only is dynamically monitored in a real-time manner, independent of a polarization state of an input signal of the optical link, and no extra hardware and control may be needed.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure, and for those of ordinary skills in the art, other accompanying drawings may be obtained according to these accompanying drawings without making an inventive effort. In the drawings.

DETAILED DESCRIPTION

In the embodiments of the present disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of the present disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

The embodiment of the present disclosure provides an apparatus for monitoring a change of a polarization state resulted from an optical link, which is provided at an optical receiver end of an optical communications system.

Figure 1:
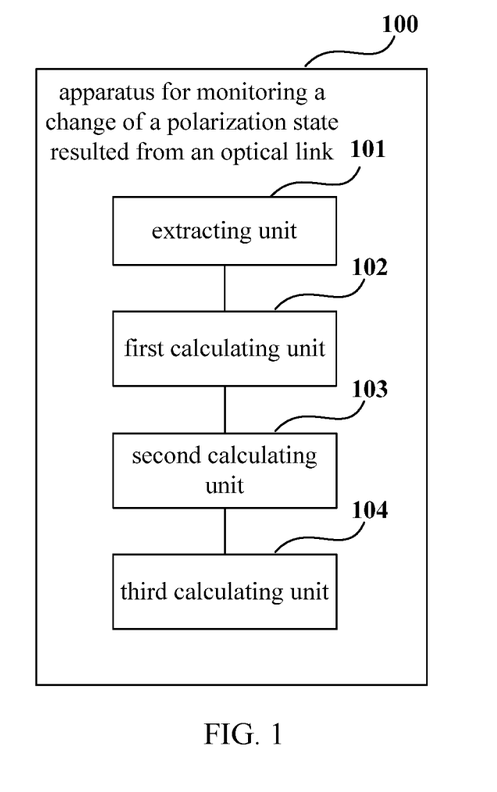
FIG. 1 is a schematic diagram of the apparatus for monitoring a change of a polarization state resulted from an optical link of Embodiment 1 of the present disclosure.

FIG. 1 is a schematic diagram of the apparatus for monitoring a change of a polarization state resulted from an optical link of Embodiment 1 of the present disclosure. As shown in FIG. 1, an apparatus 100 for monitoring a change of a polarization state includes:

an extracting unit 101 configured to extract first equalization coefficients of taps of an equalizer performing equalization processing on a first received signal received at a first moment and second equalization coefficients of taps of the equalizer performing equalization processing on a second received signal received at a second moment;

a first calculating unit 102 configured to sum up the first equalization coefficients of the taps of the equalizer to obtain a first response matrix at a zero frequency, and sum up the second equalization coefficients of the taps of the equalizer to obtain a second response matrix at the zero frequency;

a second calculating unit 103 configured to determine a change matrix of response matrices at the first moment and the second moment according to the first response matrix and the second response matrix; and a third calculating unit 104 configured to, according to feature values of a matrix of the change matrix in the Stokes space, determine a parameter characterizing a change of a polarization state resulted from an optical link.

It can be seen from the above embodiment that by obtaining a change matrix of response matrices at two moments, and determining a parameter characterizing a change of a polarization state resulted from an optical link according to feature values of a matrix of the change matrix in the Stokes space, the change of the polarization state resulted from the optical link only is dynamically monitored in a real-time manner, independent of a polarization state of an input signal of the optical link, and no extra hardware and control may be needed.

In this embodiment, equalization processing, frequency offset compensation processing, and optical transmitter non-ideality compensation processing, and determination of a code error rate on the received signals are performed at the receiver end, and existing methods may be used in above processing.

In this embodiment, the extracting unit 101 extracts the first equalization coefficients of the taps of the equalizer performing equalization processing on the first received signal received at the first moment and the second equalization coefficients of the taps of the equalizer performing equalization processing on the second received signal received at the second moment; wherein, the first moment and the second moment are two moments having a time interval, and what is monitored by the apparatus 100 for monitoring a change of a polarization state is the change of a polarization state between the first moment and the second moment.

In this embodiment, an existing adaptive equalizer may be used as the equalizer, and adaptive equalization may be performed on the received signals by using an existing algorithm.

For example, the first equalization coefficients are expressed as $$\begin{bmatrix} w_{hh(n-1)} & w_{vh(n-1)} \\ w_{hv(n-1)} & w_{vv(n-1)} \end{bmatrix},$$

and the second equalization coefficients are expressed as $$\begin{bmatrix} w_{hhn} & w_{vhn} \\ w_{hvn} & w_{vvn} \end{bmatrix};$$

where, h and v respectively denote a first polarization state and a second polarization state, n is a positive integer, a moment n−1 is the first moment, and a moment n is the second moment.

In this embodiment, the first calculating unit 102 sums up the first equalization coefficients of the taps of the equalizer to obtain the first response matrix at the zero frequency, and sums up the second equalization coefficients of the taps of the equalizer to obtain the second response matrix at the zero frequency.

For example, the first calculating unit 102 obtains the first response matrix and the second response matrix according to formulae (1) and (2) below:

$$W_{n-1} = \begin{bmatrix} W_{hh(n-1)} & W_{vh(n-1)} \\ W_{hv(n-1)} & W_{vv(n-1)} \end{bmatrix} = \begin{bmatrix} \Sigma w_{hh(n-1)} & \Sigma w_{vh(n-1)} \\ \Sigma w_{hv(n-1)} & \Sigma w_{vv(n-1)} \end{bmatrix}, \quad (1)$$

$$W_n = \begin{bmatrix} W_{hhn} & W_{vhn} \\ W_{hvn} & W_{vvn} \end{bmatrix} = \begin{bmatrix} \Sigma w_{hhn} & \Sigma w_{vhn} \\ \Sigma w_{hvn} & \Sigma w_{vvn} \end{bmatrix}; \quad (2)$$

where, $W_{n-1}$ denotes the first response matrix at the zero frequency, $W_n$ denotes the second response matrix at the zero frequency, $$\begin{bmatrix} w_{hh(n-1)} & w_{vh(n-1)} \\ w_{hv(n-1)} & w_{vv(n-1)} \end{bmatrix}$$

denotes the first equalization coefficients, $$\begin{bmatrix} w_{hhn} & w_{vhn} \\ w_{hvn} & w_{vvn} \end{bmatrix}$$

denotes the second equalization coefficients, and h and v respectively denote the first polarization state and the second polarization state.

In this embodiment, the second calculating unit 103 determines the change matrix of the response matrices at the first moment and the second moment according to the first response matrix and the second response matrix.

For example, the second calculating unit 103 multiplies the second response matrix by an inverse matrix of the first response matrix to obtain the change matrix. For example, the change matrix is obtained according to formula (3) below:

$$DW = W_n \cdot (W_{n-1})^{-1} \quad (3),$$

where, DW denotes the change matrix, $W_{n-1}$ denotes the first response matrix, and $W_n$ denotes the second response matrix.

In this embodiment, the apparatus 100 for monitoring a change of a polarization state may further include:

a normalization processing unit 105 configured to perform normalization processing on the change matrix.

For example, the normalization processing unit 105 performs normalization processing on the change matrix by using formula (4) below:

$$DW = DW/\sqrt{\det(DW)} \quad (4);$$

where, DW denotes the change matrix, and det(DW) denotes calculation of a determinant of the change matrix.

In this embodiment, in a case where the normalization processing unit 105 performs normalization processing on the change matrix, the third calculating unit 104 determines the parameter characterizing a change of a polarization state resulted from an optical link according to feature values of a matrix of the normalized change matrix in the Stokes space.

The change matrix DW is a 2×2 complex unit matrix, which may be expressed in a form as below:

$$DW = \begin{bmatrix} a & b \\ -b* & a* \end{bmatrix} \quad (5)$$

where, DW denotes the change matrix, and $|a|^2+|b|^2=1$.

A form of the change matrix DW corresponding to the Stokes space may be expressed by formula (6) below:

$$DW \to M = \begin{bmatrix} |a|^2 - |b|^2 & -2\text{Re}(ab^*) & -2\text{Im}(ab^*) \\ 2\text{Re}(ab) & \text{Re}(a^2 - b^2) & \text{Im}(a^2 + b^2) \\ -2\text{Im}(ab) & -\text{Im}(a^2 - b^2) & \text{Re}(a^2 + b^2) \end{bmatrix}; \quad (6)$$

where, M is a 3×3 real-number matrix, the matrix M having three eigenvalues, 1, λ, λ*, and eigenvectors corresponding to the three eigenvalues are expressed as $u_1$, $u_2$ and $u_3$.

Any polarization state at a moment on an optical signal may be expressed by this group of eigenvectors:

$$S_{n-1} = \begin{bmatrix} s_1 \\ s_2 \\ s_3 \end{bmatrix} = \alpha_1 u_1 + \alpha_2 u_2 + \alpha_3 u_3, \quad (7)$$

$$\alpha_1^2 + \alpha_2^2 + \alpha_3^3 = 1; \quad (8)$$

where, $S_{n-1}$ denotes a polarization state of the optical signal at a previous moment (the first moment), and real numbers $\alpha_1$, $\alpha_2$ and $\alpha_3$ are weights.

The polarization state $S_{n-1}$ at the previous moment (the first moment) becomes into $S_n$ after being changed by the optical link, and the changes of the polarization state in the Stokes domain at the two moments of time may be written as:

$$|S_n - S_{n-1}| = \qquad (9)$$
$$|MS_{n-1} - S_{n-1}| = |\alpha_1 u_1 + \alpha_2 \lambda u_2 + \alpha_3 \lambda^* u_3 - (\alpha_1 u_1 + \alpha_2 u_2 + \alpha_3 u_3)| =$$
$$|(\lambda - 1)\alpha_2 u_2 + (\lambda^* - 1)\alpha_3 u_3| = \sqrt{(1 - \alpha_1^2)(2 - 2\text{Re}(\lambda))}\ ;$$

where, $S_{n-1}$ denotes the polarization state of the optical signal at the previous moment (the first moment), real numbers $\alpha_1$, $\alpha_2$ and $\alpha_3$ are weights, 1, $\lambda$, $\lambda^*$ are three eigenvectors of the matrix M, and $u_1$, $u_2$ and $u_3$ denote eigenvectors corresponding to the three eigenvalues.

In this embodiment, the parameter characterizing a change of a polarization state resulted from an optical link includes a maximum polarization change and/or a maximum polarization rotation angle, the maximum polarization change being a maximum polarization change of a signal light at any polarization state inputted into an optical link resulted from the optical link after the signal light passes through the optical link, and the maximum polarization rotation angle being a maximum deflection angle of a signal light at any polarization state inputted into an optical link resulted from the optical link after the signal light passes through the optical link.

For example, as $\alpha_1$, $\alpha_2$ and $\alpha_3$ are all real numbers, in the Stokes domain, for a signal light at any input polarization state passing through an optical link to be detected, a maximum change of a polarization state resulted from the optical link to be detected is calculated by using formula (10) below:

$$Rot\theta = \sqrt{2 - 2\text{Re}(\lambda)} = \sqrt{4 - 4\text{Re}(c)^2} \qquad (10);$$

where, $Rot\theta$ denotes the maximum polarization change, $\lambda$ denotes the feature values of the matrix M of the change matrix in the Stokes space, and c denotes an element of a first row and a first column of the change matrix, or an element of a second row and a second column of the change matrices, or a combination of the two elements in any proportion.

The maximum polarization rotation angle resulted from the optical link to be detected may be calculated by using formula (11) below, which is obtained by simplifying formula (10):

$$dSOP = 2\arcsin\left(\frac{Rot\theta}{2}\right), Rot\theta = \sqrt{4 - \text{Re}(c)^2}\ ; \qquad (11)$$

where, $Rot\theta$ denotes the maximum polarization change, dSOP denotes the maximum polarization rotation angle, $\lambda$ denotes the feature values of a matrix of the change matrix in the Stokes space, and c denotes an element of a first row and a first column of the change matrix, or an element of a second row and a second column of the change matrices, or a combination of the two elements in any proportion.

It can be seen from the above embodiment that by obtaining a change matrix of response matrices at two moments, and determining a parameter characterizing a change of a polarization state resulted from an optical link according to feature values of a matrix of the change matrix in the Stokes space, the change of the polarization state resulted from the optical link only is dynamically monitored in a real-time manner, independent of a polarization state of an input signal of the optical link, and no extra hardware and control may be needed.

Embodiment 2

The embodiment of the present disclosure provides an optical receiver, including the apparatus for monitoring a change of a polarization state described in Embodiment 1, reference being able to be made to Embodiment 1 for particular structure and functions of the apparatus for monitoring a change of a polarization state, which shall not be described herein any further.

Figure 2:
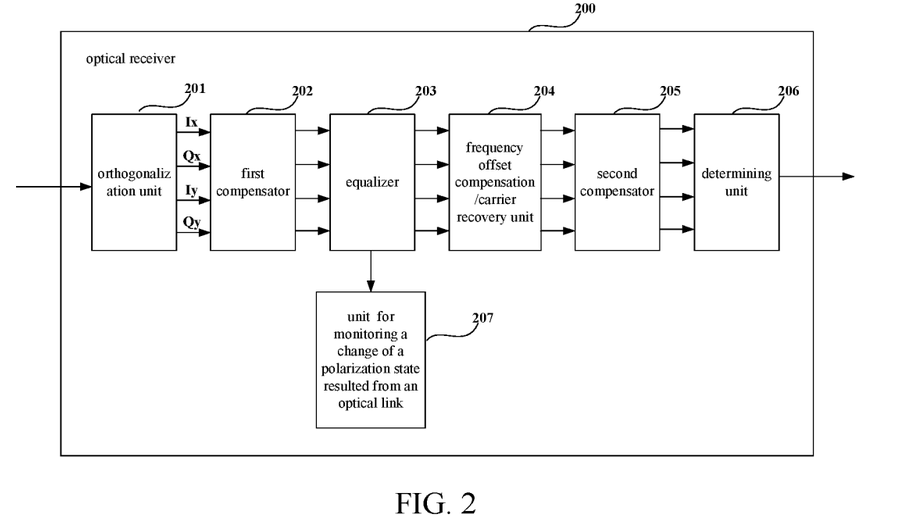
FIG. 2 is a block diagram of a systematic structure of the optical receiver of Embodiment 2 of the present disclosure.

FIG. 2 is a block diagram of a systematic structure of the optical receiver of Embodiment 2 of the present disclosure. As shown in FIG. 2, an optical receiver 200 includes an orthogonalization unit 201, a first compensator 202, an equalizer 203, a frequency offset compensation/carrier recovery unit 204, a second compensator 205, a determining unit 206 and a unit 207 for monitoring a change of a polarization state resulted from an optical link.

In this embodiment, reference may be made to the related art for particular structures and functions of the orthogonalization unit 201, the first compensator 202, the equalizer 203, the frequency offset compensation/carrier recovery unit 204, the second compensator 205 and the determining unit 206.

In this embodiment, a particular structure and functions of the unit 207 for monitoring a change of a polarization state resulted from an optical link are the same as those of the apparatus 100 for monitoring a change of a polarization state in Embodiment 1, and reference may be made to Embodiment 1 for details.

As shown in FIG. 2, a received signal is inputted to the orthogonalization unit 201, the orthogonalization unit 201 decomposes the received signal into four channels of signals, an Ix-channel signal, a Qx-channel signal, an Iy-channel signal, and a Qy-channel signal, the first compensator 202 performs compensation on a receiver end damage according to a parameter of the receiver end damage, after being performed receiver end damage compensation, the received signal is inputted into the equalizer 203 for being performed adaptive equalization processing, after being performed equalization processing by the equalizer 203, the received signal is inputted into the frequency offset compensation/carrier recovery unit 204 for being performed frequency offset compensation and carrier recovery, the second compensator 205 performs compensation on a transmitter end damage according to a parameter of the transmitter end damage, after being performed transmitter end damage compensation, the received signal is inputted into the determining unit 206 for determination and then outputted, and the unit 207 for monitoring a change of a polarization state resulted from an optical link obtains a change matrix of response matrices at two moments according to coefficients of taps of the equalizer 203 at the two moments, and according to feature values of a matrix of the change matrix in the Stokes space, determines a parameter characterizing a change of a polarization state resulted from an optical link.

In this embodiment, the optical receiver 200 does not necessarily include all of the components shown in FIG. 2; and furthermore, the optical receiver 200 may include components not shown in FIG. 2, and reference may be made to related art.

In this embodiment, the functions of the unit 207 for monitoring a change of a polarization state resulted from an optical link may be carried out by a processor of the optical receiver, such as a digital signal processor (DSP) of the receiver.

It can be seen from the above embodiment that by obtaining a change matrix of response matrices at two moments, and determining a parameter characterizing a change of a polarization state resulted from an optical link according to feature values of a matrix of the change matrix in the Stokes space, the change of the polarization state resulted from the optical link only is dynamically monitored in a real-time manner, independent of a polarization state of an input signal of the optical link, and no extra hardware and control may be needed.

Embodiment 3

The embodiment of the present disclosure provides a method for monitoring a change of a polarization state resulted from an optical link, corresponding to the apparatus for monitoring a change of a polarization state resulted from an optical link described in Embodiment 1.

Figure 3:
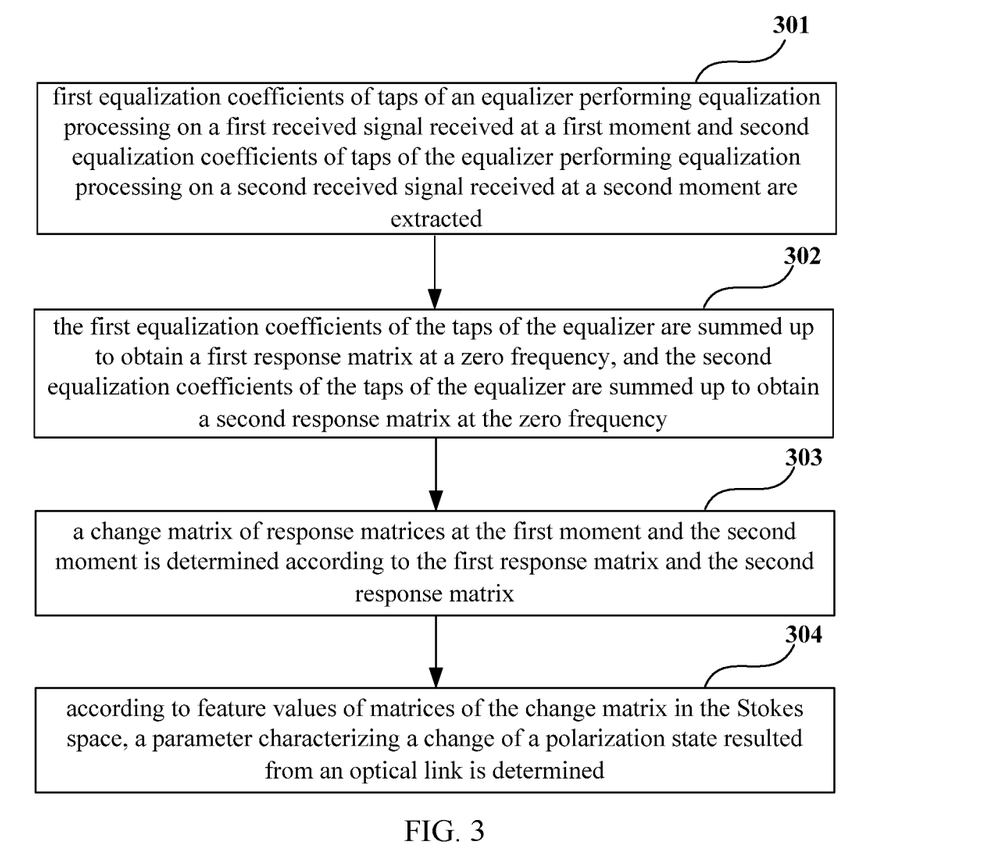
FIG. 3 is a flowchart of the method for monitoring a change of a polarization state resulted from an optical link.

FIG. 3 is a flowchart of the method for monitoring a change of a polarization state resulted from an optical link. As shown in FIG. 3, the method includes:

Step 301: first equalization coefficients of taps of an equalizer performing equalization processing on a first received signal received at a first moment and second equalization coefficients of taps of the equalizer performing equalization processing on a second received signal received at a second moment are extracted;

Step 302: the first equalization coefficients of the taps of the equalizer are summed up to obtain a first response matrix at a zero frequency, and the second equalization coefficients of the taps of the equalizer are summed up to obtain a second response matrix at the zero frequency;

Step 303: a change matrix of response matrices at the first moment and the second moment is determined according to the first response matrix and the second response matrix; and Step 304: according to feature values of matrices of the change matrix in the Stokes space, a parameter characterizing a change of a polarization state resulted from an optical link is determined.

It can be seen from the above embodiment that by obtaining a change matrix of response matrices at two moments, and determining a parameter characterizing a change of a polarization state resulted from an optical link according to feature values of a matrix of the change matrix in the Stokes space, the change of the polarization state resulted from the optical link only is dynamically monitored in a real-time manner, independent of a polarization state of an input signal of the optical link, and no extra hardware and control may be needed.

An embodiment of the present disclosure provides a computer readable program, which, when executed in an apparatus for monitoring a change of a polarization state resulted from an optical link, may cause a computer to carry out the method for monitoring a change of a polarization state resulted from an optical link as described in Embodiment 3 in the apparatus for monitoring a change of a polarization state resulted from an optical link or an optical receiver.

An embodiment of the present disclosure provides a computer storage medium, including a computer readable program, which may cause a computer to carry out the method for monitoring a change of a polarization state resulted from an optical link as described in Embodiment 3 in an apparatus for monitoring a change of a polarization state resulted from an optical link or an optical receiver.

The method for monitoring a change of a polarization state resulted from an optical link in the apparatus for monitoring a change of a polarization state resulted from an optical link or the optical receiver described with reference to the embodiments of the present disclosure may be directly embodied as hardware, software modules executed by a processor, or a combination thereof. For example, one or more functional block diagrams and/or one or more combinations of the functional block diagrams shown in FIG. 1 may either correspond to software modules of procedures of a computer program, or correspond to hardware modules. Such software modules may respectively correspond to the steps shown in FIG. 3. And the hardware module, for example, may be carried out by firming the soft modules by using a field programmable gate array (FPGA).

The soft modules may be located in an RAM, a flash memory, an ROM, an EPROM, and an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, when equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 1 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 1 may also be realized as a combination of computing equipment, such as a combination of a DSP and a microprocessor, multiple processors, one or more microprocessors in communication combination with a DSP, or any other such configuration.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

The invention claimed is:

1. An apparatus to monitor a change of a polarization state resulted from an optical link, the apparatus comprising:
   a memory; and
   a processor coupled to the memory and to,
      extract first equalization coefficients of taps of an equalizer performing equalization processing on a first received signal received at a first moment and second equalization coefficients of taps of the equalizer performing equalization processing on a second received signal received at a second moment;

sum up the first equalization coefficients of the taps of the equalizer to obtain a first response matrix at a zero frequency, and sum up the second equalization coefficients of the taps of the equalizer to obtain a second response matrix at the zero frequency;

determine a change matrix corresponding to the first and second response matrices at the first moment and the second moment, according to the first response matrix and the second response matrix; and determine a parameter to characterize a change of a polarization state resulted from an optical link, according to feature values of the change matrix in a Stokes space.

2. The apparatus according to claim 1, wherein,
the processor is to multiply the second response matrix by an inverse matrix of the first response matrix to obtain the change matrix.

3. The apparatus according to claim 1, wherein,
the processor is to perform normalization processing on the change matrix; and
the processor is to determine the parameter to characterize a change of a polarization state resulted from an optical link according to feature values of the normalized change matrix in the Stokes space.

4. The apparatus according to claim 1, wherein,
the parameter to characterize a change of a polarization state resulted from an optical link includes a maximum polarization change and/or a maximum polarization rotation angle;
the maximum polarization change being a maximum polarization change of a signal light at any polarization state input into an optical link resulted from the optical link after the signal light passes through the optical link; and
the maximum polarization rotation angle being a maximum deflection angle of a signal light at any polarization state input into an optical link resulted from the optical link after the signal light passes through the optical link.

5. The apparatus according to claim 4, wherein the parameter to characterize a change of a polarization state resulted from an optical link is calculated according to formula (1) and/or formula (2):

$$Rot\,\theta = \sqrt{2 - 2\mathrm{Re}(\lambda)} = \sqrt{4 - 4\mathrm{Re}(c)^2}, \quad (1)$$

$$dSOP = 2\arcsin\left(\frac{Rot\,\theta}{2}\right); \quad (2)$$

where, Rotθ denotes the maximum polarization change, dSOP denotes the maximum polarization rotation angle, λ denotes the feature values of the change matrix in the Stokes space, and c denotes an element of a first row and a first column of the change matrix, or an element of a second row and a second column of the change matrix, or a combination of the two elements in any proportion.

6. An optical receiver, comprising the apparatus as claimed in claim 1.

7. A method of monitoring a change of a polarization state resulted from an optical link, the method comprising:
extracting first equalization coefficients of taps of an equalizer performing equalization processing on a first received signal received at a first moment and second equalization coefficients of taps of the equalizer performing equalization processing on a second received signal received at a second moment;

summing up the first equalization coefficients of the taps of the equalizer to obtain a first response matrix at a zero frequency, and summing up the second equalization coefficients of the taps of the equalizer to obtain a second response matrix at the zero frequency;

determining a change matrix corresponding to the first and second response matrices at the first moment and the second moment, according to the first response matrix and the second response matrix; and determine a parameter to characterize a change of a polarization state resulted from an optical link, according to feature values of the change matrix in a Stokes space.

8. The method according to claim 7, wherein the determining the change matrix comprises multiplying the second response matrix by an inverse matrix of the first response matrix to obtain the change matrix.

9. The method according to claim 7, wherein,
the method further comprises performing normalization processing on the change matrix; and
the determining a parameter to characterize a change of a polarization state resulted from an optical link includes determining the parameter to characterize a change of a polarization state resulted from an optical link according to feature values the normalized change matrix in the Stokes space.

10. The method according to claim 7, wherein,
the parameter to characterize a change of a polarization state resulted from an optical link includes a maximum polarization change and/or a maximum polarization rotation angle,
the maximum polarization change being a maximum polarization change of a signal light at any polarization state input into an optical link resulted from the optical link after the signal light passes through the optical link; and
the maximum polarization rotation angle being a maximum deflection angle of a signal light at any polarization state input into an optical link resulted from the optical link after the signal light passes through the optical link.

* * * * *